United States Patent [19]

Nakajima

[11] Patent Number: 5,015,853
[45] Date of Patent: * May 14, 1991

[54] METHOD OF RECOGNIZING IRRADIATION FIELD, AND METHOD OF ADJUSTING IMAGE PROCESSING CONDITIONS

[75] Inventor: Nobuyoshi Nakajima, Kanagawa, Japan

[73] Assignee: Fuji Photo Film Co., Ltd., Kanagawa, Japan

[*] Notice: The portion of the term of this patent subsequent to Feb. 21, 2006 has been disclaimed.

[21] Appl. No.: 498,678

[22] Filed: Mar. 26, 1990

Related U.S. Application Data

[63] Continuation of Ser. No. 125,084, Nov. 25, 1987, abandoned.

[30] Foreign Application Priority Data

Nov. 25, 1986 [JP] Japan .................... 61-280117

[51] Int. Cl.[5] .................. H04N 5/32; G01N 23/04
[52] U.S. Cl. ................................................. 250/327.2
[58] Field of Search .............. 250/327.2, 484.1; 382/22, 54; 258/284, 282

[56] References Cited

U.S. PATENT DOCUMENTS

| | | | |
|---|---|---|---|
| 4,258,264 | 3/1981 | Kotera et al. | 250/484.1 |
| 4,527,060 | 7/1985 | Suzuki et al. | 250/327.2 |
| 4,682,028 | 7/1987 | Tanaka et al. | 250/327.2 |
| 4,804,842 | 2/1989 | Nakajima | 250/327.2 |
| 4,806,759 | 2/1989 | Funashachi | 250/327.2 |

FOREIGN PATENT DOCUMENTS

| | | | |
|---|---|---|---|
| 0170270 | 2/1986 | European Pat. Off. | 250/327.2 |
| 56-11395 | 2/1981 | Japan | 250/327.2 |

OTHER PUBLICATIONS

Young et al, *Handbook of Pattern Recog. & Image Process*, Academic Press (1986) pp. 193, 200.

Primary Examiner—Jack I. Berman
Assistant Examiner—Richard Hanig
Attorney, Agent, or Firm—Sughrue, Mion, Zinn, Macpeak & Seas

[57] ABSTRACT

In a method of recognizing an irradiation field, image signals at respective positions on a recording medium are detected based on image information detected from the recording medium, and X and Y axis are set along two adjacent sides of a contour of a rectangular irradiation field on the recording medium. The image signals are added up in the X and Y axis directions respectively, and Y axis positions at which levels of added-up signals in the X axis direction are equal to a threshold value and X axis positions at which levels of added-up signals in the Y axis direction are equal to the threshold value are detected. A region surrounded by straight lines passing through these positions along the X and Y axes is recognized as the irradiation field. In the method of adjusting image processing conditions, the image processing conditions are adjusted based on the image information inside of the irradiation field thus recognized.

14 Claims, 3 Drawing Sheets

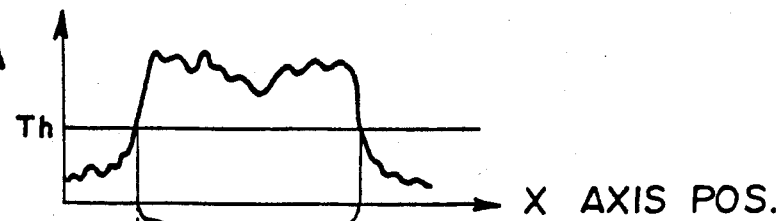
FIG.6A
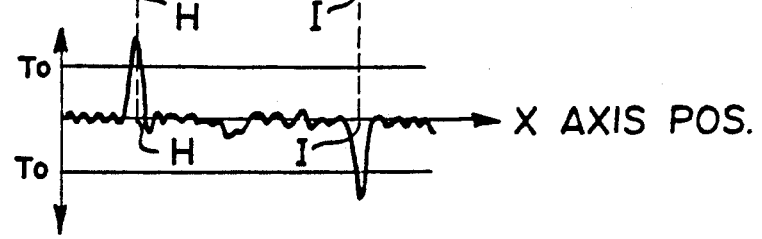
FIG.6B
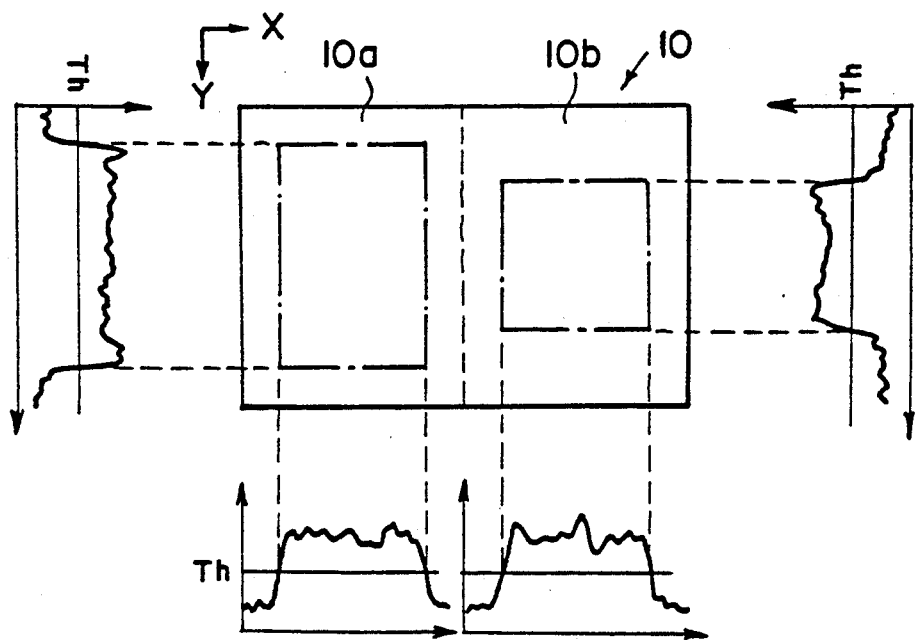
FIG.7B  FIG.7A  FIG.7D
FIG.7C  FIG.7E

METHOD OF RECOGNIZING IRRADIATION FIELD, AND METHOD OF ADJUSTING IMAGE PROCESSING CONDITIONS

This is a Continuation of application No. 07/125,084 filed Nov. 25, 1987 now abandoned.

BACKGROUND OF THE INVENTION

1. Field of the Invention

This invention relates to a method of recognizing an irradiation field in the case where a radiation image is recorded on a recording medium such as a stimulable phosphor sheet by limitation of the irradiation field of a radiation. This invention also relates to a method of adjusting image processing conditions by utilization of the method of recognizing an irradiation field in the course of the processing of image information detected from the recording medium.

2. Description of the Prior Art

When certain kinds of phosphors are exposed to radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to radiation passing through an object such as the human body to have a radiation image of the object stored thereon, and is then exposed to stimulating rays such as a laser beam which cause the stimulable phosphor sheet to emit light in proportion to the stored radiation energy. The light emitted by the stimulable phosphor sheet upon stimulation thereof is photoelectrically detected and converted to electric image signals, image processing is carried out on the electric image signals, and the radiation image of the object is reproduced as a visible image by use of the processed image signals on a recording material such as a photographic film, a display device such as a cathode ray tube (CRT), or the like.

In the aforesaid radiation image recording and reproducing system, in order to improve the image quality, particularly the diagnostic efficiency and accuracy, of the visible image, image read-out for photoelectrically detecting the light emitted by the stimulable phosphor sheet upon stimulation thereof should preferably be carried out by use of read-out conditions adjusted to appropriate values in accordance with each radiation image. From this viewpoint, one embodiment of the aforesaid radiation image recording and reproducing system has been proposed in, for example, Japanese Unexamined Patent Publication No. 58(1983)-67240. In the proposed embodiment, before final read-out is carried out by scanning the stimulable phosphor sheet carrying a radiation image of an object stored thereon by stimulating rays which cause the stimulable phosphor sheet to emit light in proportion to the radiation energy stored, detecting the emitted light by a photoelectric read-out means and converting it into electric image signals, the preliminary read-out for approximately detecting the image information stored on the stimulable phosphor sheet is carried out by use of stimulating rays of a level lower than the level of the stimulating rays used in the final read-out. Read-out conditions for the final read-out are adjusted on the basis of the information obtained by the preliminary read-out, and the final read-out is carried out by use of the read-out conditions. The electric image signals obtained by the final read-out are sent to an image processing means and are processed in accordance with the image recording portion of the object and/or the image recording method to obtain a visible image suitable for viewing, particularly for diagnostic purposes. The processed image signals are used to reproduce the visible image on a photographic film or the like.

By the term "read-out conditions" as used herein are meant various conditions affecting the relationship between the input to the read-out means and the output thereof, for example, the relationship between the input to the photoelectric read-out means (i.e. the amount of light emitted by the stimulable phosphor sheet) and the output thereof (i.e. the level of the electric image signal) in the aforesaid case. For example, the term "read-out conditions" means the read-out gain (sensitivity) determining the relationship between the input and the output of the read-out means, the scale factor (latitude), and the power of the stimulating rays used for the read-out.

As mentioned above, the level of the stimulating rays used in the preliminary read-out is adjusted to be lower than the level of the stimulating rays used in the final read-out. That is, the effective energy of the stimulating rays which the stimulable phosphor sheet receives per unit area in the preliminary read-out is adjusted to be lower than the effective energy of the stimulating rays used in the final read-out.

In the case where the image information stored on the stimulable phosphor sheet is approximately ascertained prior to the final read-out and the final read-out is carried out by use of the read-out conditions adjusted on the basis of the image information, it becomes possible to eliminate the adverse effects of a fluctuation in the level of the radiation energy stored on the stimulable phosphor sheet, which is caused by a change in the object or the image recording portion thereof, by a fluctuation in the radiation dose, or the like, and to obtain a visible image suitable for viewing, particularly for diagnostic purposes.

On the other hand, in the case where the aforesaid radiation image recording and reproducing system is used for medical diagnosis, portions of the human body not related to diagnosis should not be exposed to the radiation since it is harmful to the human body. Further, when the human body portions not related to diagnosis are exposed to radiation, the radiation is scattered by such portions to the portion related to the diagnosis, and the contrast and resolution are adversely affected by the scattered radiation. Therefore, in the aforesaid radiation image recording and reproducing system, the irradiation field is often limited in the course of recording a radiation image.

In the case where image recording is carried out by limiting the irradiation field as mentioned above, a portion inside of the irradiation field and a portion outside of the irradiation field are present on a single stimulable phosphor sheet. In this case, it is advantageous for the portion inside of the irradiation field, i.e. the position of the irradiation field contour, to be able to be discriminated.

This is because, in the case where, for example, the preliminary read-out is carried out on the stimulable phosphor sheet and the read-out conditions for the final read-out are to be adjusted on the basis of the image information obtained by the preliminary read-out, the read-out conditions should preferably be adjusted on the basis of only the preliminary read-out image information inside of the irradiation field on the stimulable phosphor sheet when image recording has been carried out by limitation of the irradiation field.

The aforesaid reason will hereinbelow be described in detail. As the method of adjusting the read-out conditions for the final read-out on the basis of the image information obtained by the preliminary read-out, a novel method has been proposed in, for example, Japanese Unexamined Patent Publication No. 60(1985)-156055. The proposed method comprises the steps of: determining a histogram of the image information (image signal level) obtained by the preliminary read-out, calculating the maximum image signal level Pmax and the minimum image signal level Pmin of a desired image information range in the histogram, and adjusting the read-out conditions for the final read-out so that the maximum image signal level Pmax and the minimum image signal level Pmin correspond respectively to the maximum signal level Qmax and the minimum signal level Qmin of a desired input signal range in an image processing means which are determined by the maximum density Dmax and the minimum density Dmin of the correct density range in the reproduced visible image.

However, in the case where image recording is carried out by limitation of the irradiation field as mentioned above, the radiation scattered by the object within the irradiation field normally passes outside of the irradiation field. The scattered radiation is absorbed and stored on the stimulable phosphor sheet which exhibits high sensitivity, and therefore the histogram of the image information (image signal level) obtained by the preliminary read-out includes the image signal level caused by the scattered radiation. Since the image signal level caused by the scattered radiation outside of the irradiation field on the stimulable phosphor sheet is often higher than the image signal level inside of the irradiation field, it is not always possible to discriminate between the image signal levels inside and outside of the irradiation field in the histogram obtained by the preliminary read-out. Therefore, in the case where Pmax and Pmin are calculated from the histogram as mentioned above and the read-out conditions are adjusted on the basis of Pmax and Pmin, the minimum image signal level inside of the irradiation field is not detected as Pmin, and that caused by the scattered radiation outside of the irradiation field is detected as Pmin. In general, the minimum image signal level outside of the irradiation field is lower than that inside of the irradiation field. Accordingly, when the minimum image signal level outside of the irradiation field is detected as Pmin, signals caused by the scattered radiation not related to diagnosis are taken within a low density range in the final read-out, and the density of the image of the portion related to diagnosis becomes too high. As a result, the image contrast decreases and it becomes difficult to make an accurate diagnosis.

Namely, in the case where a radiation image is recorded by limiting the irradiation field, the radiation scattered by the object passes outside of the irradiation field on the stimulable phosphor sheet and causes noise in the image information obtained by the preliminary read-out. Therefore, when the read-out conditions are adjusted based on such preliminary read-out image information, it is not always possible to adjust the read-out conditions to appropriate values and to obtain a visible image suitable for viewing, particularly for diagnostic purposes.

Therefore, in the case where radiation image recording is carried out by limiting the irradiation field and the read-out conditions are to be adjusted based on the preliminary read-out image information by use of the aforesaid method, the irradiation field should be recognized accurately and the read-out conditions should be adjusted based on the preliminary read-out image information inside of the irradiation field, thereby to eliminate the adverse effects of the scattered radiation outside of the irradiation field.

Besides the case wherein the read-out conditions are to be adjusted for a radiation image stored on the stimulable phosphor sheet, recognition of the irradiation field is also necessary for various purposes in the case where a radiation image is recorded on a recording medium by limitation of the irradiation field.

On the other hand, in the aforesaid radiation image recording and reproducing system, image processing is carried out as mentioned above on the image signals detected by image read-out. In general, the image processing is carried out by use of image processing conditions adjusted for each image in accordance with the image recording portion of the object and/or the image recording method to obtain a visible image suitable for viewing, particularly for diagnostic purposes. However, it may be considered that the image processing conditions be adjusted on the basis of the image information obtained by, for example, the preliminary read-out or the final read-out, instead of the image recording portion of the object and/or the image recording method, or on the basis of both the image information obtained by the preliminary read-out or the final read-out and the image recording portion of the object and/or the image recording method.

However, as mentioned above, in the case where image recording is carried out by limiting the irradiation field, information (noise) caused by the scattered radiation outside of the irradiation field is contained in the image information obtained by the preliminary read-out or the final read-out. Therefore, in this case, it is not always possible to obtain such appropriate image processing conditions as originally expected to be obtained by the adjustment based on the image information, even though the image processing conditions are adjusted on the basis of the image information obtained by the preliminary read-out or the final read-out.

Therefore, in the case where image recording is carried out by limiting the irradiation field and the image processing conditions are to be adjusted based on the image information as mentioned above, the image processing conditions should preferably be adjusted based on noise-free image information obtained by eliminating the information caused by the scattered radiation, instead of being adjusted directly based on the detected image information.

Besides the case of image recording utilizing the stimulable phosphor sheet, the aforesaid problems with regard to the adjustment of the image processing conditions arise generally in the case where a radiation image is recorded on a recording medium by limitation of the irradiation field.

By the term "image processing conditions" as used herein are meant various conditions affecting the relationship between the input to the image processing means and the output thereof, for example, gradation processing conditions and frequency response processing conditions.

SUMMARY OF THE INVENTION

The primary object of the present invention is to provide a method of recognizing an irradiation field in the case where a radiation image is recorded on a recording medium such as a stimulable phosphor sheet by limiting the irradiation field in a rectangular form.

Another object of the present invention is to provide a method of adjusting image processing conditions based on noise-free image information obtained by eliminating the information caused by scattered radiation outside of the irradiation field in the case where a radiation image is recorded on a recording medium such as a stimulable phosphor sheet by limiting the irradiation field in a rectangular form.

The present invention provides a method of recognizing an irradiation field wherein a rectangular irradiation field is recognized in the case where a radiation image is recorded on a recording medium by limitation of the irradiation field in a rectangular form, the method of recognizing the irradiation field comprising the steps of:

(i) detecting image signals at their respective positions on said recording medium on the basis of the image information detected from said recording medium, (ii) setting an X axis and a Y axis along two adjacent sides of a contour of said rectangular irradiation field on said recording medium, (iii) adding up said image signals in said X axis direction and in said Y axis direction, detecting positions on said Y axis at which the levels of the added-up signals in said X axis direction are equal to a predetermined threshold value Th, and detecting positions on said X axis at which the levels of the added-up signals in said Y axis direction are equal to the predetermined threshold value Th, and (iv) recognizing a region, which is surrounded by straight lines in said X axis direction at said positions on said Y axis and straight lines in said Y axis direction at said positions on said X axis on said recording medium, as the irradiation field.

The present invention also provides a method of adjusting image processing conditions in the case where image information detected from a recording medium carrying a radiation image stored thereon by limitation of an irradiation field in a rectangular form is processed, the method of adjusting image processing conditions comprising the steps of:

(i) detecting image signals at respective positions on said recording medium on the basis of the image information detected from said recording medium, (ii) setting an X axis and a Y axis along two adjacent sides of a contour of said rectangular irradiation field on said recording medium, (iii) adding up said image signals in said X axis direction and in said Y axis direction, detecting positions on said Y axis at which the levels of the added-up signals in said X axis direction are equal to a predetermined threshold value Th, and detecting positions on said X axis at which the levels of the added-up signals in said Y axis direction are equal to the predetermined threshold value Th, (iv) recognizing a region, which is surrounded by straight lines in said X axis direction at said positions on said Y axis and straight lines in said Y axis direction at said positions on said X axis on said recording medium, as the irradiation field, and (v) adjusting said image processing conditions on the basis of the image information inside of said recognized irradiation field in said image information detected from said recording medium.

By the term "recording medium" as used herein is meant a medium capable of recording a radiation image thereon, such as a stimulable phosphor sheet. However, the recording medium is not limited to the stimulable phosphor sheet.

By the term "image information detected from a recording medium" is meant the image information detected by reading out a radiation image recorded on a recording medium by any method, for example, the image information detected by the preliminary read-out or the final read-out from the stimulable phosphor sheet. However, said image information is not limited to the information detected in this manner from the stimulable phosphor sheet.

Of course, the method of utilizing the irradiation field recognized in accordance with the present invention is not limited to any particular method.

Also, in the method of adjusting image processing conditions in accordance with the present invention, the image information utilized for recognition of the irradiation field and the image information utilized for adjustment of the image processing conditions may be identical or different from each other. For example, the irradiation field may be recognized based on the final read-out image information, and the image processing conditions may be adjusted based on the final read-out image information inside of the irradiation field. Or, the irradiation field may be recognized based on the preliminary read-out image information, and the image processing conditions may be adjusted based on the preliminary read-out image information or the final read-out image information inside of the irradiation field.

Adjustment of the image processing conditions on the basis of the image information inside of the irradiation field embraces the case wherein the adjustment is carried out based on only the image information inside of the irradiation field and the case wherein the adjustment is carried out based on the image information inside of the irradiation field and the other factors such as the image recording portion of the object and/or the image recording method.

Also, adjustment of the image processing conditions may be carried out in any manner insofar as the adjustment is effected on the basis of the image information inside of the irradiation field, i.e. by the utilization of said image information.

The image processing conditions may typically be gradation processing conditions, but are not limited thereto.

As mentioned above, with the method of recognizing an irradiation field in accordance with the present invention, the irradiation field is detected based on the added-up signals obtained by adding up the image signals in the X axis direction and in the Y axis direction which are set along the rectangular irradiation field contour, and based on the threshold value Th determined appropriately.

In the case where image recording is carried out by limiting the irradiation field, little radiation impinges upon the region outside of the irradiation field on the recording medium, and therefore the image signals in said region are of a low level. On the other hand, in the region inside of the irradiation field, radiation impinges upon the region after passage through the object or directly without passing through the object, and therefore the image signals in said region are of a high level.

Accordingly, in the case where the X axis and the Y axis are set along two adjacent sides of the contour of the rectangular irradiation field and the image signals are added up in the X axis direction, the added-up signals in the region outside of the irradiation field on the Y axis are of a low level, and the added-up signals in the region inside of the irradiation field are of a very high level. Also, in the case where the image signals are added up in the Y axis direction, the added-up signals in the region outside of the irradiation field on the X axis are of a low level, and the added-up signals in the region inside of the irradiation field are of a very high level.

Therefore, with the method of recognizing an irradiation field in accordance with the present invention wherein the added-up signals obtained by signal addition in the X axis direction and in the Y axis direction are studied, the region wherein the levels of the added-up signals are comparatively higher than the levels of the added-up signals in the other regions on the recording medium is detected by use of the threshold value Th adjusted to an appropriate value, and the region thus detected is recognized as the irradiation field. Thus the rectangular irradiation field can be recognized accurately.

Also, with the method of recognizing an irradiation field wherein the irradiation field is detected based on the added-up signals obtained by adding up the image signals in the X axis direction and in the Y axis direction and based on the threshold value Th adjusted to an appropriate value, the irradiation field can be detected quickly with a very simple algorithm.

With the method of adjusting image processing conditions in accordance with the present invention, the irradiation field is recognized by use of the aforesaid method of recognizing an irradiation field in accordance with the present invention, and the image processing conditions are adjusted based on the image information inside of the recognized irradiation field.

In the case where the irradiation field is detected and only the image information inside of the irradiation field is extracted, the image information thus extracted represents the true image information obtained by removing the image information caused by scattered radiation outside of the irradiation field from the image information detected from the overall area of the recording medium, i.e. the true image information free from noise caused by scattered radiation.

Therefore, with the method of adjusting image processing conditions in accordance with the present invention, the adjustment of the image processing conditions can be effected based on the true image information free from noise caused by scattered radiation, and consequently the image processing conditions can be adjusted to more appropriate values.

BRIEF DESCRIPTION OF THE DRAWINGS

FIG. 6A is a graph showing the added-up signals obtained by adding up the digital image signals in the Y axis direction, FIG. 6B is a graph showing the differentiated values of the added-up signals shown in FIG. 6A, FIG. 7A is a schematic view showing the stimulable phosphor sheet carrying radiation images stored thereon by subdivision image recording, FIGS. 7B to 7E are graphs showing the added-up signals obtained by adding up the digital image signals in the X axis direction and in the Y axis direction.

DESCRIPTION OF THE PREFERRED EMBODIMENTS

The present invention will hereinbelow be described in further detail with reference to the accompanying drawings.

First, an embodiment of the method of recognizing an irradiation field in accordance with the present invention will be described below.

Figure 1:
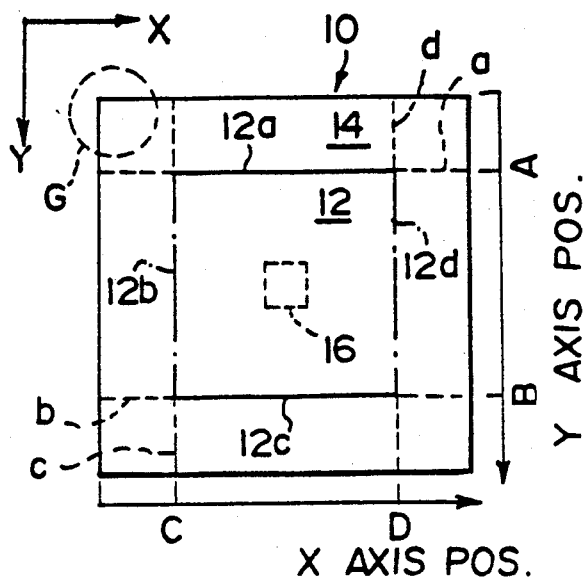
FIG. 1 is a schematic view showing the stimulable phosphor sheet carrying a radiation image stored thereon by limitation of the irradiation field in a rectangular form.

The embodiment described below is for the case where an irradiation field 12 is recognized on the basis of preliminary read-out image information detected from a stimulable phosphor sheet 10 carrying a radiation image stored thereon by limitation of the irradiation field in a rectangular form as shown in FIG. 1.

In this embodiment, digital image signals at their respective positions on the stimulable phosphor sheet 10 are first detected from the image information obtained by the preliminary read-out as mentioned above.

By "image information obtained by preliminary read-out" is meant the information which is obtained by detecting the light emitted by the stimulable phosphor sheet in the course of the preliminary read-out scanning with stimulating rays by use of a photoelectric conversion means and which is constituted by electric signals corresponding to light emission amounts at the respective scanning points, i.e. the respective picture elements, on the stimulable phosphor sheet. Of course, the information corresponds to the radiation image stored on the stimulable phosphor sheet.

Figure 2A:
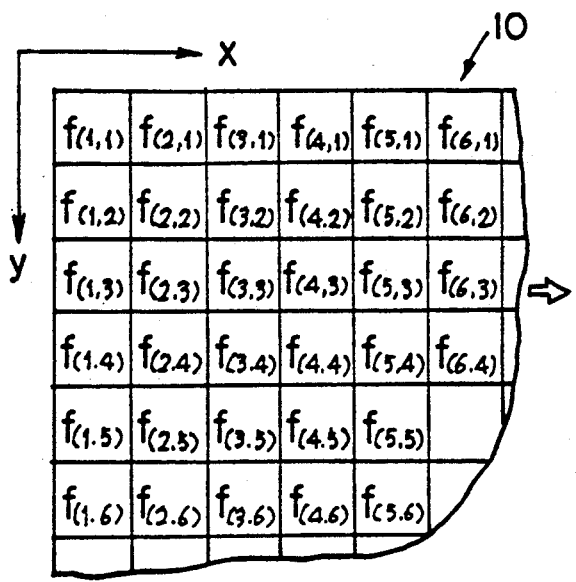
FIGS. 2A and 2B are enlarged views of the portion G shown in FIG. 1 and respectively show examples of digital image signals at their respective positions on the stimulable phosphor sheet.

FIG. 2A is an enlarged view showing the portion G of the stimulable phosphor sheet 10 in FIG. 1. In FIG. 2A, the respective cells indicate the respective picture elements, and f(1,1), f(1,2) . . . represent the digitized preliminary read-out image information at picture elements (1,1), (1,2), . . . .

In order to obtain the digital image signals at the respective positions on the stimulable phosphor sheet from the preliminary read-out image information, it is necessary to set the positions on the stimulable phosphor sheet. The positions may be set in the unit of the picture element, or a plurality of picture elements related to each other, for example, three to five picture elements arrayed in a predetermined direction may be set at one position. In the former case, by "digital image signals at respective positions" are meant signals obtained by digitizing the aforesaid image information at the picture element corresponding to each position. In the latter case, by "digital image signals at their respective positions" are meant signals determined on the basis of the aforesaid image information at a plurality of the picture elements included in each position, for example, a digital image signal obtained by averaging the image information at the plurality of the picture elements.

In this embodiment, the position setting is carried out in the unit of the picture element as in the former case. Position setting as in the latter case will be described later with reference to FIG. 2B.

Thereafter, the digital image signals obtained in the manner mentioned above are added up in the directions of an X axis and a Y axis which are set on the stimulable phosphor sheet 10 along adjacent sides 12a and 12b of the contour of the rectangular irradiation field 12 as indicated by the chain lines in FIG. 1. As shown in FIGS. 1 and 2A, in ordinary image recording, the sides of the stimulable phosphor sheet 10 are parallel to the rectangular contour of the irradiation field 12. Therefore, the X and Y axes are parallel to the two adjacent sides of the stimulable phosphor sheet 10, and coincide respectively with the main scanning direction and the sub-scanning direction in the preliminary read-out and in the final read-out.

Additions of the digital image signals in the X axis direction and in the Y axis direction are carried out in the manner described below. The positions forming in line in the X axis direction are taken as a line, and the positions forming in line in the Y axis direction are taken as a line. Specifically, the line of positions (1,1), (2,1), (3,1), (4,1), (5,1), . . . in the X axis direction is taken as the first line Lx1 in the X axis direction, and the line of positions (1,2), (2,2), (3,2), (4,2), (5,2), . . . is taken as the second line Lx2 in the X axis direction. In the same manner, the third line Lx3, the fourth line Lx4, and so on in the X axis direction are determined sequentially. Also, the line of positions (1,1), (1,2), (1,3), (1,4), . . . in the Y axis direction is taken as the first line Ly1 in the Y axis direction, and the line of positions (2,1), (2,2), (2,3), (2,4), . . . is taken as the second line Ly2 in the Y axis direction. In the same manner, the third line Ly3, the fourth line Ly4, and so on in the Y axis direction are determined sequentially. For each of the lines thus determined, the digital image signals at the respective positions on the line are added up.

Figure 3:
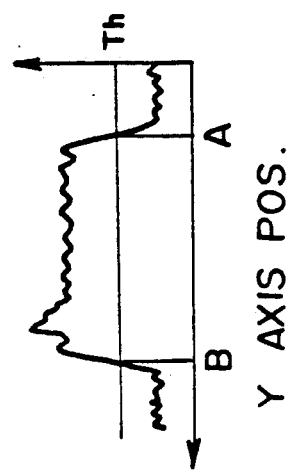
FIG. 3 is a graph showing the added-up signals obtained by adding up the digital image signals in the X axis direction.
Figure 4:
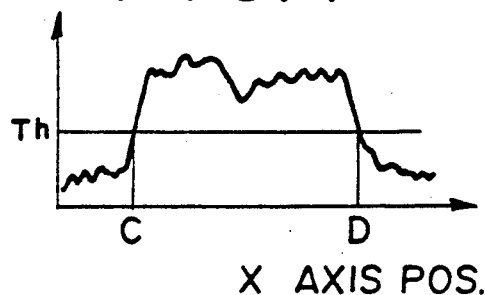
FIGS. 4 and 5 are graphs showing the added-up signals obtained by adding up the digital image signals in the Y axis direction.

The added-up signals obtained by adding up the digital image signals in the X axis direction are shown in FIG. 3, and those obtained by adding up the digital image signals in the Y axis direction are shown in FIG. 4.

In the case where image recording is carried out by limiting the irradiation field, since little radiation impinges upon a region 14 outside of the irradiation field 12 on the stimulable phosphor sheet 10, the image signals at region 14 are of a low level. In the irradiation field 12, since the radiation passing through an object or outside of the object impinges upon the stimulable phosphor sheet 10 inside of the irradiation field 12, the image signals become of a high level.

Therefore, in the case where the irradiation field 12 is rectangular as shown, when the X axis and the Y axis are set along adjacent sides 12a and 12b of the contour of the irradiation field 12 and the digital image signals are added up in the X axis direction, the added-up signals at regions on the Y axis outside of the irradiation field 12 are of a low level as shown in FIG. 3, and the added-up signals at the region on the Y axis inside of the irradiation field 12 are of a very high level. Also, as shown in FIG. 4, when the digital image signals are added up in the Y axis direction, the added-up signals at the regions on the X axis outside of the irradiation field 12 are of a low level, and the added-up signals at the region on the X axis inside of the irradiation field 12 are of a very high level.

Therefore, the irradiation field 12 may be recognized by studying the added-up signals obtained by the addition of the digital image signals in the X axis direction and in the Y axis direction, and detecting the region on the stimulable phosphor sheet 10 where the levels of the added-up signals are higher than those at the other regions.

In the method of recognizing an irradiation field in accordance with the present invention, the high level region, i.e. the irradiation field 12, is detected by use of a threshold value Th adjusted to an appropriate value.

Specifically, an approximately median level value between the high level value and the low level value of the added-up signals may be determined by an appropriate method, and used as the threshold value Th. Positions A and B on the Y axis as shown in FIG. 3, at which the levels of the added-up signals in the X axis direction are equal to the predetermined threshold value Th, are detected. Also, positions C and D on the X axis as shown in FIG. 4, at which the levels of the added-up signals in the Y axis direction are equal to the predetermined threshold value Th, are detected. As shown in FIG. 1, the region on the stimulable phosphor sheet 10 surrounded by straight lines a and b in the X axis direction at the positions A and B on the Y axis and straight lines c and d in the Y axis direction at the positions C and D on the X axis is recognized as the irradiation field 12.

The threshold value Th may also be determined in various manners, some examples of which are described below.

First, a characteristic value such as an average value, a median value or the minimum value of the digital image signals inside of a predetermined region 16 at the center of the stimulable phosphor sheet 10 as shown in FIG. 1, for example, inside of a 5 cm×5 cm rectangular region, may be calculated, and a value obtained by multiplying the characteristic value by 1/α may be used as the threshold value Th. This method is based on the presumption that the region at the center of the stimulable phosphor sheet 10 is always included in the irradiation field 12. The characteristic value such as the average value, the median value or the minimum value of the image signals at the center region of the sheet 10 represents the image signals inside of the irradiation field 12. Therefore, when the characteristic value is multiplied by 1/α wherein α denotes a value adjusted appropriately by consideration of the number of signals present on the line in the X axis direction or in the Y axis direction, safety factors, and the like, it is possible to obtain such a threshold value Th that the region where the levels of the added-up signals are higher than the threshold value Th is the irradiation field 12, and the region where the levels of the added-up signals are lower than the threshold value Th is the region 14 outside of the irradiation field.

Figure 5:
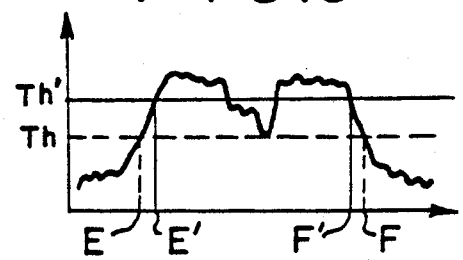

In a second method, a temporary threshold value Th' may be calculated by multiplying the characteristic value of the image signals at the predetermined center region 16 by 1/α in the same manner as in the aforesaid first method. Then, as shown in FIG. 5, positions E' and F' at which the levels of the added-up signals are equal to the temporary threshold value Th' are detected, and the minimum value of the added-up signals between the positions E' and F' is taken as the threshold value Th. In this case, of course, the range between the positions E and F at which the levels of the added-up signals are equal to the threshold value Th is recognized as the irradiation field 12. In the case where the minimum value of the added-up signals between the positions E' and F' is equal to the temporary threshold value Th', the minimum value Th' is taken as the threshold value Th.

In a third method, the added-up signals in the X axis direction and the added-up signals in the Y axis direction are respectively differentiated, and the added-up signal value at a point where the absolute value of the differentiated value exceeds a predetermined threshold value To is taken as the threshold value Th. FIG. 6A shows an example of the added-up signals obtained by adding up the digital image signals in the Y axis direction, and FIG. 6B shows differentiated values obtained by differentiation of the added-up signals shown in FIG. 6A. For example, as shown in FIGS. 6A and 6B, at the contour portions of the irradiation field, the added-up signals change sharply from a low level to a high level or vice versa, and therefore the absolute values of the differentiated values become far larger than those at the other portions. Based on these findings, an appropriate threshold value To is determined, positions H and I as shown in FIG. 6B at which the absolute values of the differentiated values exceed the threshold value To are detected, and the levels of the added-up signals at the positions H and I are taken as the threshold value Th as shown in FIG. 6A. FIGS. 6A and 6B show the case where the added-up signals at the positions H and I are of the same level. In the case where the added-up signals at the positions H and I are of different values, the lower value, the average value, or the like thereof may be taken as the threshold value Th.

In the aforesaid embodiment, position setting on the stimulable phosphor sheet 10 is carried out in the unit of the picture element, and the digital image signals are obtained at the respective picture elements. However, it is also possible to determine a plurality of the picture elements related to each other as one position and to obtain the digital image signals at the respective positions thus determined. An example of such a method will be described hereinbelow.

In the example described below, the digital image signals in the case where they are added up in the X axis direction and the digital image signals in the case where they are added up in the Y axis direction are obtained independently.

Figure 2B:
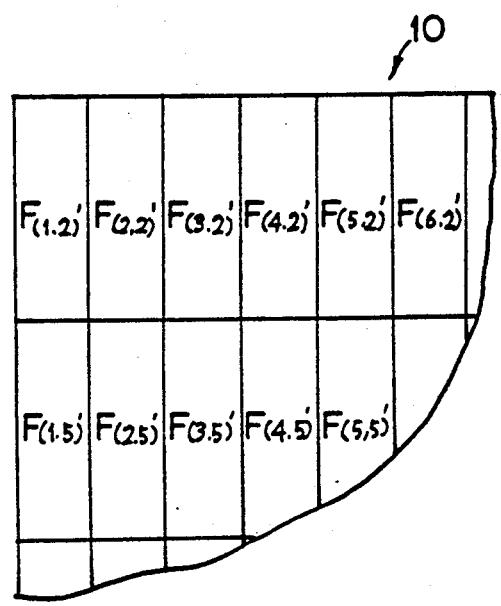

First, in the case where the digital image signals are added up in the X axis direction, as shown in FIG. 2B, sets of three picture elements adjacent in the Y axis direction in FIG. 2A are determined as the respective positions as expressed by Position (1,2)' = picture elements (1,1) + (1,2) + (1,3)
Position (2,2)' = picture elements (2,1) + (2,2) + (2,3)

-continued

Position (1,5)' = picture elements (1,4) + (1,5) + (1,6)
Position (2,2)' = picture elements (2,4) + (2,5) + (2,6)

Digital image signals F at the respective positions are calculated as $$F(1,2)' = [F(1,1) + f(1,2) + f(1,3)]/3$$
$$F(2,2)' = [F(2,1) + f(2,2) + f(2,3)]/3$$

$$F(1,5)' = [F(1,4) + f(1,5) + f(1,6)]/3$$
$$F(2,5)' = [F(2,4) + f(2,5) + f(2,6)]/3$$

Second, in the case where the digital image signals are added up in the Y axis direction, sets of three picture elements adjacent in the X axis direction in FIG. 2A are determined as the respective positions as expressed by Position (2,1)' = picture elements (1,1) + (2,1) + (3,1)
Position (2,2)' = picture elements (1,2) + (2,2) + (3,2)

Position (5,1)' = picture elements (4,1) + (5,1) + (6,1)
Position (5,2)' = picture elements (4,2) + (5,2) + (6,2)

The digital image signals F at the respective positions are calculated by arithmetic averaging in the same manner as mentioned above for the positions (1,2)', (2,2)', ...

The process of the position setting and the calculation of the digital image signals as mentioned above is equivalent to pre-processing of the preliminary read-out image information at the respective picture elements followed by adding-up processing or the like. In the case where the pre-processing is carried out, it is possible to eliminate the adverse effects of noise contained in the image information, and to decrease the number of image signals which are to be processed. As a result, it becomes possible to detect the irradiation field contour more accurately and quickly.

The method of recognizing an irradiation field in accordance with the present invention is applicable also to the case of subdivision image recording wherein the area of the stimulable phosphor sheet 10 is divided into, for example, two subdivisions 10a and 10b as shown in FIG. 7A and image recording is carried out at each subdivision by limiting the irradiation field. In this case, the method of recognizing an irradiation field in accordance with the present invention may be applied to the subdivisions 10a and 10b respectively by obtaining in advance the information on the subdivision image recording. Specifically, for the subdivision 10a, the aforesaid method may be applied by obtaining the added-up signals in the Y axis direction and in the X axis direction at the subdivision 10a as shown in FIGS. 7B and 7C. For the subdivision 10b, the aforesaid method may be applied by obtaining the added-up signals in the Y axis direction and in the X axis direction at the subdivision 10b as shown in FIGS. 7D and 7E.

Also, in the embodiment shown in FIG. 1, after the positions A and B on the Y axis as shown in FIG. 3 are detected, adding up of the digital image signals in the Y axis direction for detecting the positions C and D on the X axis may be carried out only on the image signals between the positions A and B.

The irradiation field recognized in the manner as mentioned above may be utilized for various purposes. For example, the irradiation field can be utilized in the case where only the image information inside of the irradiation field is extracted from the preliminary read-out image information as mentioned above and the read-out conditions are adjusted based on the extracted image information, and in the case where only the image information inside of the irradiation field is extracted from the final read-out image information and the image processing conditions are adjusted based on the extracted image information as will be described below. Also, the irradiation field can be utilized in the case where only the image information inside of the irradiation field is extracted from the preliminary read-out image information and the image processing conditions are adjusted based on the extracted image information. The irradiation field can also be utilized for other purposes, for example, in the case where the irradiation field is recognized from the preliminary read-out image information and the read-out region in the final read-out is limited to the region inside of the irradiation field as disclosed in, for example, Japanese Unexamined Patent Publication No. 60(1985)-120346. In the case where the read-out region in the final read-out is limited to the region inside of the irradiation field, noise components caused by scattered radiation and stored outside of the irradiation field on the stimulable phosphor sheet are not detected in the final read-out, and a final visible image having a high image quality can be obtained. Also, since the read-out region is limited, it becomes possible to shorten the read-out time or to increase the read-out density.

Besides the preliminary read-out image information as in the aforesaid embodiment, recognition of the irradiation field in accordance with the present invention may be effected based on the other image information, for example, based on the final read-out image information.

An embodiment of the method of adjusting image processing conditions in accordance with the present invention will now be described below.

The embodiment described below is for the case where the irradiation field is recognized on the basis of the final read-out image information detected from the stimulable phosphor sheet carrying a radiation image stored thereon by limitation of the irradiation field in a rectangular form, and gradation processing conditions as one kind of the image processing conditions are adjusted based on the final read-out image information inside of the recognized irradiation field.

In this embodiment, the image information is obtained by carrying out the final read-out on the stimulable phosphor sheet.

In order to obtain the image information by carrying out the final read-out, the stimulable phosphor sheet is scanned with stimulating rays, and the light emitted by the stimulable phosphor sheet when scanned with stimulating rays is detected by a photoelectric read-out means. The image information obtained by the final read-out means the information which is constituted by electric signals corresponding to light emission amounts at the respective scanning points, i.e. the respective picture elements, on the stimulable phosphor sheet.

Then, digital image signals at their respective positions on the stimulable phosphor sheet are detected from the image information obtained in the manner mentioned above, and an X axis and a Y axis are set along two adjacent sides of the contour of the rectangular irradiation field on the stimulable phosphor sheet. The digital image signals are added up in the X axis direction and in the Y axis direction, positions on the Y axis at which the levels of the added-up signals in the X axis direction are equal to a predetermined threshold value Th are detected, and positions on the X axis at which the levels of the added-up signals in the Y axis direction are equal to the predetermined threshold value Th are detected. Also a region, which is surrounded by straight lines in the X axis direction at said positions on the Y axis and straight lines in the Y axis direction at said positions on the X axis on the stimulable phosphor sheet, is recognized as the irradiation field.

The method of recognizing the irradiation field utilized in this embodiment is the same as the aforesaid method of recognizing an irradiation field in accordance with the present invention.

Then, the gradation processing conditions are adjusted on the basis of the image information inside of the recognized irradiation field in the final read-out image information detected from the stimulable phosphor sheet. The adjustment may be carried out in various manners, for example, by the method as described below.

Specifically, there may be used a method comprising the steps of: determining a histogram of the final read-out image information (image signal level) inside of the irradiation field, calculating the maximum image signal level Pmax and the minimum image signal level Pmin of a desired image signal range in the histogram, and adjusting the gradation processing conditions so that the maximum image signal level Pmax and the minimum image signal level Pmin correspond respectively to the maximum signal level Rmax and the minimum signal level Rmin of a desired input signal range in an image reproduction means which are determined by the maximum density Dmax and the minimum density Dmin of the correct density range in the reproduced visible image.

Figure 8:
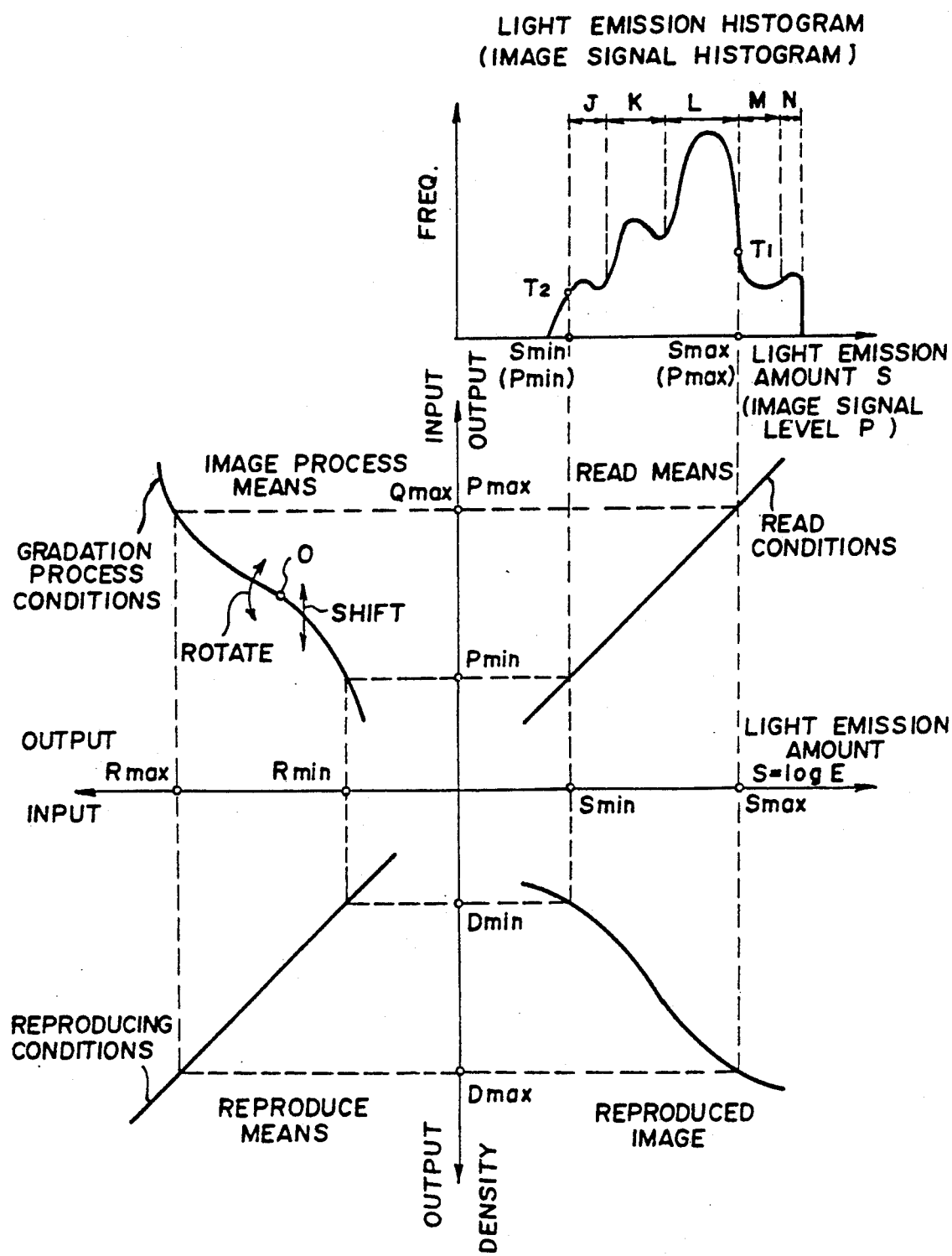
FIG. 8 is a graph showing the step of adjusting the gradation processing conditions on the basis of a desired image information range.

The aforesaid method will hereinbelow be described in detail with reference to FIG. 8. In FIG. 8, instead of a histogram of the electric image signals obtained by photoelectrically detecting the light emitted by a stimulable phosphor sheet by use of a photoelectric read-out means, a histogram of the light emission amounts of the stimulable phosphor sheet prior to the photoelectric detection thereof is shown. The light emission amounts are converted into electric image signals by use of fixed and linear read-out conditions as shown in FIG. 8. Therefore, the light emission amount and the image signal level have a proportional relationship to each other with a fixed constant of proportionality, and the histogram of the light emission amounts is substantially equivalent to the histogram of the image signals. Accordingly, in the following descriptions, the histogram of the light emission amounts shown in FIG. 8 is regarded as the histogram of the image signals.

The image information used for the creation of the histogram in this embodiment need not necessarily be the information detected by use of the linear read-out conditions as mentioned above insofar as the image information has some correspondent relationship with the light emission amount, and may be the image information detected by use of, for example, non-linear read-out conditions.

Specifically, in this method, a histogram of the final read-out image information (image signals) inside of the irradiation field is created, and a desired image signal range (range of the amount of emitted light) is determined on the basis of the histogram. Since the pattern of the histogram is approximately fixed by the image recording portion of an object and/or the image recording method, the desired image signal range is determined from the histogram with reference to the image recording portion of an object and/or the image recording method. For example, in the case of chest image recording, the pattern of the histogram becomes as shown in FIG. 8, and it is possible to know that J in the histogram denotes the mediastinum, K denotes the heart, L denotes the lungs, M denotes the skin and the soft tissue, and N denotes the region outside of the object. Therefore, from the histogram, it is possible to calculate the maximum image signal level Pmax (i.e. the maximum light emission amount Smax) and the minimum image signal level Pmin (i.e. the minimum light emission amount Smin) defining the desired image signal range. For example, in the case where information on the skin and the soft tissue (M) and information on the region outside of the object (N) are unnecessary in FIG. 8, the desired image signal range becomes that from Pmax to Pmin including J, K and L as shown. The maximum image signal level Pmax and the minimum image signal level Pmin may be calculated by use of various methods from the histogram, for example, by determining threshold values T1 and T2 in accordance with the desired image signal range and calculating Pmax and Pmin on the basis of T1 and T2.

On the other hand, in the radiation image recording and reproducing system, electric image signals are generally obtained from the light emitted by the stimulable phosphor sheet in proportion to the stored radiation energy by use of the photoelectric read-out means as mentioned above, and are subjected to various signal processings in the image processing means, particularly gradation processing. The processed image signals are used to reproduce a visible image on a photographic film or the like by use of the image reproduction means. The reproduced visible image should have a correct density range suitable for viewing, particularly for diagnostic purposes. In general, the correct density range (Dmax to Dmin) is determined in advance. Also, image reproducing conditions in the image reproduction means (i.e. the conditions determining the relationship between the input to the image reproduction means and the output therefrom) are determined in advance. Therefore, the range of signal levels (Rmax to Rmin) which should be sent to the image reproduction means as suitable for obtaining the correct density range (Dmax to Dmin) is determined by the image reproducing conditions.

Accordingly, the gradation processing conditions in the gradation processing are adjusted so that the maximum image signal level Pmax and the minimum image signal level Pmin calculated in the manner mentioned above correspond to the maximum signal level Rmax and the minimum signal level Rmin determined in the manner mentioned above.

The gradation processing is carried out for converting the level of each image signal fed to an image processing means (a gradation processing means) by use of predetermined conditions. The predetermined conditions are referred to as the gradation processing conditions, and the gradation processing conditions are usually expressed by a non-linear gradation curve.

The purpose of the gradation processing is to obtain a visible reproduced image suitable for viewing, particularly for diagnostic purposes, in accordance with the image recording conditions, for example, the image recording portion of the object such as the head or the chest, and/or the image recording method such as plain image recording or contrasted image recording. Therefore, in general, basic patterns of non-linear gradation processing conditions most suitable for the respective image recording conditions should preferably be determined in advance, one of the basic patterns of the gradation processing conditions should be selected in accordance with the image recording conditions of an image in the course of gradation processing of the image, and the gradation processing should be carried out by use of the selected basic pattern.

Also in this embodiment, an appropriate basic pattern is selected from those of the gradation processing conditions predetermined in accordance with the image recording conditions of the images. The gradation processing conditions which are to be used are adjusted by correcting the selected basic pattern on the basis of the image information inside of the irradiation field, i.e. by, as shown in the second quadrant of FIG. 8, vertically shifting the selected basic pattern or rotating it around a predetermined center point 0 so that Pmax corresponds to Rmax or Pmin corresponds to Rmin.

Besides the non-linear gradation processing conditions determined by the image recording conditions mentioned above, linear gradation processing conditions may be used in some cases. In such a case, the gradation processing conditions which are to be used are adjusted by rotating or shifting a single predetermined straight line in the manner mentioned above so that Pmax corresponds to Rmax or Pmin corresponds to Rmin. The adjustment of the gradation processing conditions by this method is carried out on the basis of only the image information inside of the irradiation field, instead of on the basis of the image recording portion of the object and/or the image recording method.

In the case where the gradation processing of the radiation image is carried out by use of the gradation processing conditions adjusted to appropriate values in accordance with each radiation image (image information) stored on the stimulable phosphor sheet, it becomes possible to process the image so that the necessary object image information is always expressed within the correct density range suitable for viewing, particularly for diagnostic purposes, in every reproduced visible image regardless of any fluctuation in the level of the radiation energy stored on the stimulable phosphor sheet, which is caused by changes in the object, the image recording portion thereof, radiation dose, or the like.

Also, in this case, the gradation processing conditions can be adjusted based on the image information free from noise caused by scattered radiation in accordance with the present invention, and therefore the desired image information range can be determined more accurately from the image information histogram. As a result, the effects of expressing the necessary object image information within the correct density range are enhanced markedly.

The method of adjusting the gradation processing conditions in the manner mentioned above is advantageous particularly in the case where the image information detected by use of the read-out conditions adjusted without considering a fluctuation in the radiation energy level range recorded in each image recording as mentioned above is to be processed.

It should be understood that the method of recognizing an irradiation field and the method of adjusting image processing conditions in accordance with the present invention are not limited to the aforesaid embodiments, and may be embodied in various other manners.

I claim:

1. A method of recognizing an irradiation field wherein a rectangular irradiation field is recognized in a case where a radiation image is recorded on a recording medium by limitation of the irradiation field in a rectangular form, the method of recognizing an irradiation field comprising the steps of:
  (i) detecting image signals at respective positions on said recording medium on the basis of the image information detected from said recording medium,
  (ii) setting an X axis and a Y axis along two adjacent sides of a contour of said rectangular irradiation field on said recording medium.
  (iii) adding up said image signal in said X axis direction and in said Y axis direction, detecting positions on said Y axis at which levels of the added-up signals in said X axis direction are equal to or greater than a predetermined threshold value Th, and detecting positions on said X axis at which the levels of the added-up signals in said Y axis direction are equal to or greater than the predetermined threshold value Th, and
  (iv) recognizing a region, which is surrounded by straight lines in said X axis direction at said positions on said Y axis and straight lines in said Y axis direction at said positions on said X axis on said recording medium, as the irradiation field,
  wherein a characteristic value of the image signals inside of a predetermined region at the center of said recording medium is calculated, and a value obtained by multiplying said characteristic value by $1/\alpha$ wherein $\alpha$ denotes a value adjusted by consideration of the number of said image signals present in said X axis direction or in said Y axis direction, safety factors and the like is used as said threshold value Th.

2. The method as defined in claim 1, wherein said recording medium is a stimulable phosphor sheet.

3. A method of recognizing an irradiation field wherein a rectangular irradiation field is recognized in a case wherein a radiation image is recorded on a recording medium by limitation of the irradiation field in a rectangular form, the method of recognizing an irradiation field comprising the steps of:
  (i) detecting image signals at respective positions on said recording medium on the basis of the image information detected from said recording medium,
  (ii) setting an X axis and a Y axis along two adjacent sides of a contour of said rectangular irradiation field on said recording medium,
  (iii) adding up said image signal in said X axis direction and in said Y axis direction, detecting positions on said Y axis at which levels of the added-up signals in said X axis direction are equal to or greater than a predetermined threshold value Th, and detecting positions on said X axis at which the levels of the added-up signals in said Y axis direction are equal to or greater than the predetermined threshold value Th, and
  (iv) recognizing a region, which is surrounded by straight lines in said X axis direction at said positions on said Y axis and straight lines in said Y axis direction at said positions on said X axis on said recording medium, as the irradiation field,
  wherein a characteristic value of the image signals inside of a predetermined region at the center of said recording medium is calculated, a temporary threshold value Th is calculated by multiplying said characteristic value by $1/\alpha$ wherein $\alpha$ denotes a value adjusted by consideration of the number of said image signals present in said X axis direction or in said Y axis direction, safety factors and the like, positions at which the levels of the added-up signals are equal to said temporary threshold value Th are detected, and the minimum value of the added-up signals between said detected positions is used as said threshold value Th.

4. The method as defined in claim 3, wherein said recording medium is a stimulable phosphor sheet.

5. A method of recognizing an irradiation field wherein a rectangular irradiation field is recognized in a case wherein a radiation image is recorded on a recording medium by limitation of the irradiation field in a rectangular form, the method of recognizing an irradiation field comprising the steps of:
  (i) detecting image signals at respective positions on said recording medium on the basis of the image information detected from said recording medium,
  (ii) setting an X axis and a Y axis along two adjacent sides of a contour of said rectangular irradiation field on said recording medium,
  (iii) adding up said image signals in said X axis direction and in said Y axis direction, detecting positions on said Y axis at which levels of the added-up signals in said X axis direction are equal to or greater than a predetermined threshold value Th, and detecting positions on said X axis at which the levels of the added-up signals in said Y axis direction are equal to or greater than the predetermined threshold value Th, and
  (iv) recognizing a region, which is surrounded by straight lines in said X axis direction at said positions on said Y axis and straight lines in said Y axis direction at said positions on said X axis on said recording medium, as the irradiation field,
  wherein the added-up signals in said X axis direction and the added-up signals in said Y axis direction are respectively differentiated, and the added-up signal value at a point where the absolute value of the differentiated value exceeds a predetermined threshold value To is used as said threshold value Th.

6. The method as defined in claim 5, wherein said recording medium is a stimulable phosphor sheet.

7. A method of adjusting image processing conditions in the case where image information detected from a recording medium carrying a radiation image stored thereon by limitation of an irradiation field in a rectangular form is processed, the method of adjusting image processing conditions comprising the steps of:
  (i) detecting image signals at respective positions on said recording medium on the basis of the image information detected from said recording medium, (ii) setting an X axis and a Y axis along two adjacent sides of a contour of said rectangular irradiation field on said recording medium, (iii) adding up said image signals in said X axis direction and in said Y axis direction, detecting positions on said Y axis at which the levels of the added-up signals in said X axis direction are equal to or greater than a predetermined threshold value Th, and detecting positions on said X axis at which the levels of the added-up signals in said Y axis direction are equal to or greater than the predetermined threshold value Th, (iv) recognizing a region, which is surrounded by straight lines in said X axis direction at said positions on said Y axis and straight lines in said Y axis direction at said positions on said X axis on said recording medium, as the irradiation field, and (v) adjusting said image processing conditions on the basis of the image information inside of said recognized irradiation field in said image information detected from said recording medium, wherein a characteristic value of the signals inside of a predetermined region at the center of said recording medium is calculated, and a value obtained by multiplying said characteristic value by $1/\alpha$ wherein $\alpha$ denotes a value adjusted by consideration of the number of said image signals present in said X axis direction or in said Y axis direction, safety factors and the like is used as said threshold value Th.

8. The method as defined in claim 7, wherein said recording medium is a stimulable phosphor sheet.

9. A method of adjusting image processing conditions in the case where image information detected from a recording medium carrying a radiation image stored thereon by limitation of an irradiation field in a rectangular form is processed, the method of adjusting image processing conditions comprising the steps of:

(i) detecting image signals at respective positions on said recording medium on the basis of the image information detected from said recording medium, (ii) setting an X axis and a Y axis along two adjacent sides of a contour of said rectangular irradiation field on said recording medium, (iii) adding up said image signals in said X axis direction and in said Y axis direction, detecting positions on said Y axis at which the levels of the added-up signals in said X axis direction are equal to or greater than a predetermined threshold value Th, and detecting positions on said X axis at which the levels of the added-up signals in said Y axis direction are equal to or greater than the predetermined threshold value Th, (iv) recognizing a region, which is surrounded by straight lines in said X axis direction at said positions on said Y axis and straight lines in said Y axis direction at said positions on said X axis on said recording medium, as the irradiation field, and (v) adjusting said image processing conditions on the basis of the image information inside of said recognized irradiation field in said image information detected from said recording medium, wherein a characteristic value of the image signals inside of a predetermined region at the center of said recording medium is calculated, a temporary threshold value Th is calculated by multiplying said characteristic value by $1/\alpha$ wherein $\alpha$ denotes a value adjusted by consideration of the number of said image signals present in said X axis direction or in said Y axis direction, safety factors and the like, positions at which the levels of the added-up signals are equal to said temporary threshold value Th are detected, and the minimum value of the added-up signals between said detected positions is used as said threshold value Th.

10. The method as defined in claim 9, wherein said recording medium is a stimulable phosphor sheet.

11. A method of adjusting image processing conditions in the case where image information detected from a recording medium carrying a radiation image stored thereon by limitation of an irradiation field in a rectangular form is processed, the method of adjusting image processing conditions comprising the steps of:

(i) detecting image signals at respective positions on said recording medium on the basis of the image information detected from said recording medium, (ii) setting an X axis and a Y axis along two adjacent sides of a contour of said rectangular irradiation field of said recording medium, (iii) adding up said image signals in said X axis direction and in said Y axis direction, detecting positions on said Y axis at which the levels of the added-up signals in said X axis direction are equal to or greater than a predetermined threshold value Th, and detecting positions on said X axis at which the levels of the added-up signals in said Y axis direction are equal to or greater than the predetermined threshold value Th, (iv) recognizing a region, which is surrounded by straight lines in said X axis direction at said positions on said Y axis and straight lines in said Y axis direction at said positions on said X axis on said recording medium, as the irradiation field, and (v) adjusting said image processing conditions on the basis of the image information inside of said recognized irradiation field in said image information detected from said recording medium, wherein the added-up signals in said X axis direction and the added-up signals in said Y axis direction are respectively differentiated, and the added-up signal value at a point where the absolute value of the differentiated value exceeds a predetermined threshold value To is used as said threshold value Th.

12. The method as defined in claim 11, wherein said recording medium is a stimulable phosphor sheet.

13. A method of adjusting image processing conditions in the case where image information detected from a recording medium carrying a radiation image stored thereon by limitation of an irradiation field in a rectangular form is processed, the method of adjusting image processing conditions comprising the steps of:

(i) detecting image signals at respective positions on said recording medium on the basis of the image information detected from said recording medium, (ii) setting an X axis and a Y axis along two adjacent sides of a contour of said rectangular irradiation field on said recording medium, (iii) adding up said image signals in said X axis direction and in said Y axis direction, detecting positions on said Y axis at which the levels of the added-up signals in said X axis direction are equal to or greater than a predetermined threshold value Th, and detecting positions on said X axis at which the levels of the added-up signals in said Y axis direction are equal to or greater than the predetermined threshold value Th, (iv) recognizing a region, which is surrounded by straight lines in said X axis direction at said positions on said Y axis and straight lines in said Y axis direction at said positions on said X axis on said recording medium, as the irradiation field, and (v) adjusting said image processing conditions on the basis of the image information inside of said recognized irradiation field in said image information detected from said recording medium, wherein said image processing conditions are gradation processing conditions, and said gradation processing conditions are adjusted by:

(a) determining a histogram of said image information inside of said irradiation field, (b) calculating the maximum image signal level Pmax and the minimum image signal level Pmin of a desired image signal range in said histogram, and (c) adjusting said gradation processing conditions so that the maximum image signal level Pmax and the minimum image signal level Pmin correspond respectively to the maximum signal level Rmax and the minimum signal level Rmin of a desired input signal range in an image reproduction means which is determined by the maximum density Dmax and the minimum density Dmin of a correct density range in a reproduced visible image.

14. The method as defined in claim 13, wherein said recording medium is a stimulable phosphor sheet.

* * * * *